(12) United States Patent
Aghaei Moghadam et al.

(10) Patent No.: US 10,189,913 B2
(45) Date of Patent: Jan. 29, 2019

(54) BIOPOLYMERS HAVING COILED NANOSTRUCTURES AND PROCESSES INCORPORATING THE BIOPOLYMERS

(71) Applicant: Biopolynet Inc., Fredericton (CA)

(72) Inventors: Mostafa Aghaei Moghadam, Fredericton (CA); Alma Zangeneh, Fredericton (CA)

(73) Assignee: BIOPOLYNET INC., Fredericton (CA)

( * ) Notice: Subject to any disclaimer, the term of this patent is extended or adjusted under 35 U.S.C. 154(b) by 282 days.

(21) Appl. No.: 15/042,822

(22) Filed: Feb. 12, 2016

(65) Prior Publication Data
US 2016/0237174 A1  Aug. 18, 2016

Related U.S. Application Data

(60) Provisional application No. 62/116,007, filed on Feb. 13, 2015.

(51) Int. Cl.
*C08L 3/02* (2006.01)
*C22B 1/24* (2006.01)
(Continued)

(52) U.S. Cl.
CPC ........ *C08B 31/003* (2013.01); *C08B 37/0057* (2013.01); *C08L 3/02* (2013.01);
(Continued)

(58) Field of Classification Search
CPC ....... C22B 1/2406; C22B 1/242; C22B 1/243; C22B 1/244; C08B 31/003; C08L 3/02
See application file for complete search history.

(56) References Cited

U.S. PATENT DOCUMENTS 3,779,782 A * 12/1973 Erickson ............... C04L 333/13
                                                  106/DIG. 4
4,802,914 A *  2/1989 Rosen .................... C22B 1/2406
                                                  75/321
(Continued)

FOREIGN PATENT DOCUMENTS

GB          1383368 A  *  2/1974  ............... C22B 1/16

OTHER PUBLICATIONS

Maki, Yasuyuki et al. "Anisotropric Structure of Calcium-Induced Alginate Gels by Optical and Small-Angle X-ray Scattering Measurements." Biomacromolecules. vol. 12, pp. 2145-2152. dx.doi.org/10.1021/bm200223p (Year: 2011).*

(Continued)

*Primary Examiner* — George Wyszomierski
*Assistant Examiner* — Tima M McGuthry-Banks
(74) *Attorney, Agent, or Firm* — Bereskin & Parr LLP/S.E.N.C.R.L., s.r.l.; Tony Orsi

(57) ABSTRACT

The present disclosure is generally directed to biopolymers having coiled nanostructures, methods of making those biopolymers, and applications involving those biopolymers. Biopolymers having coiled nanostructures may be produced through a biophysical process by which the shape of a biopolymer macromolecular chain is altered. Biopolymers having coiled nanostructures may then be cross-linked to prepare biopolymeric networks. The biopolymeric networks may be configured to incorporate solid particles, in which they serve to hold the solid particles together against external stresses, solvents, and the like. For this reason, the biopolymers having coiled nanostructures are useful in a variety of applications, including in an improved process for forming iron ore pellets.

12 Claims, 4 Drawing Sheets

(51) Int. Cl.
  C08B 31/00   (2006.01)
  C22B 1/242   (2006.01)
  C22B 1/243   (2006.01)
  C22B 1/244   (2006.01)
  C08B 37/00   (2006.01)
  C08L 5/04    (2006.01)
  C08L 5/14    (2006.01)

(52) U.S. Cl.
  CPC ............. $C22B\ 1/242$ (2013.01); $C22B\ 1/243$ (2013.01); $C22B\ 1/244$ (2013.01); $C22B\ 1/2406$ (2013.01)

(56) References Cited

U.S. PATENT DOCUMENTS

| | | | | |
|---|---|---|---|---|
| 5,000,783 | A * | 3/1991 | Dingeman | C22B 1/244 75/321 |
| 5,302,186 | A * | 4/1994 | Field | C22B 1/242 75/320 |
| 2010/0112224 | A1* | 5/2010 | Lott | B65G 3/02 427/333 |
| 2015/0232730 | A1* | 8/2015 | Zim | B05D 7/00 427/212 |

OTHER PUBLICATIONS

Morch, Y. A. et al. "Molecular Engineering as an Approach to Design New Functional Prooperties of Alginate." Biomacromolecules. vol. 8, pp. 2809-2814. dx.doi.org/10.1021/bm700502b (Year: 2007).*

Kontogiorgos, Vassilis. "Chapter Three: Polysaccharaide Nanostructures" in Edible Nanostructures: A Bottom-up Approach. Edited by Maragoni et al published 2014 pp. 41-67 (Year: 2015).*

Robitzer, Mike et al. "Nanostructure of Calcium Alginate Aerogels Obtained from Multistep Solvent Exchange Route." Langmuir, vol. 24 pp. 12547-12552. (Year: 2008).*

Furedy, "Metso—Iron Ore Pelletization—The Right Choice", Iron Ore Pelletizing, 2010 <https://www.metalbulletin.com/events/download.ashx/document/speaker/6579/a0ID000000X0jeqMAB/Presentation>.

Siam Cement Group, "Pelletization—SRI", YouTube, 2008 <https://www.youtube.com/watch?v=_1HnlVjv_n8>.

Sharma, "Bentonite Pelletizing", YouTube, 2013 <https://www.youtube.com/watch?v=cIMyeZxTY5l>.

Staffs Powder Processing Ltd, "Pelletizing Process", YouTube, 2014 <https://www.youtube.com/watch?v=E3YTCBfQ45c>.

Satyendra, "Iron ore pellets and Pelletizing processes", ISPAT Guru, 2013 <http://ispatguru.com/iron-ore-pellets-and-pelletizing-processes>.

Veverka et al., "A Comparison of Liquid Binders for Limestone Pelletizing", Institute for Briquetting and Agglomeration 27th Biennial Conference; Providence, RI, 2001.

Schulte, "Iron Ore Pelletizing—Clariant Mining Solutions", Clariant Mining Solutions, YouTube, 2013 <https://www.youtube.com/watch?v=7Fh61pNIVa4>.

Sivrikaya et al., "Alternative Binders to Bentonite for Iron Ore Pelletizing—Part II: Effects on Metallurgical and Chemical Properties", HOLOS, 2014, Ano 30, vol. 3, pp. 104-111.

Sivrikaya et al., "Use of Organic Binders and Borates in Pelletizing of Iron Oxides", IV International Boron Symposium; Eskiehir, Turkey, 2009, pp. 251-256.

Haas et al., "Effectiveness of Organic Binders for Iron Ore Pelletization", Report of Investigations, United States Department of the Interior, Bureau of Mines; 1989, 26 pages.

Eisele et al., "A review of binders in iron ore pelletization", Minderal Processing and Extractive Metallurgy Review: An International Journal, 2003, 24(1): 1-90.

Halt et al., "Review of Organic Binders for Iron Ore Agglomeration", Michigan Technological University, Department of Chemical Engineering; Houghton, MI, 2013.

Bhuiyan et al., "Microstructure of Bentonite in Iron Ore Green Pellets", Microsc. Microanal., 2014, 20(1): 33-41.

Srivastava et al., "Study of Organic and Inorganic Binders on Strength of Iron Oxide Pellets", Metallurgical and Materials Transactions B, 2013, 44B(4): 1000-1009.

Shapovalov Metallurgist et al., "The Use of Bentonite Clays from the Voskresensk Deposit to Make Iron-Ore Pellets", 2014, 58(5-6): 367-371.

Sivrikaya et al., "The bonding/strengthening mechanism of colemanite added organic binders in iron ore pelletization", International Journal of Mineral Processing, 2012, 110-111: 90-100.

* cited by examiner

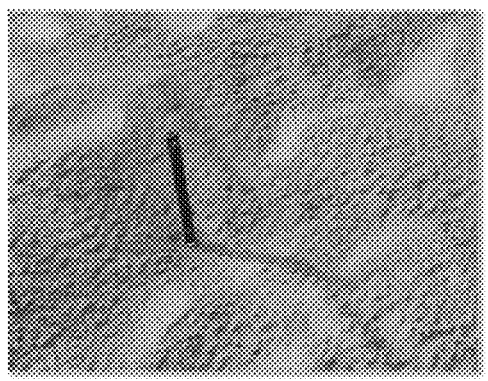 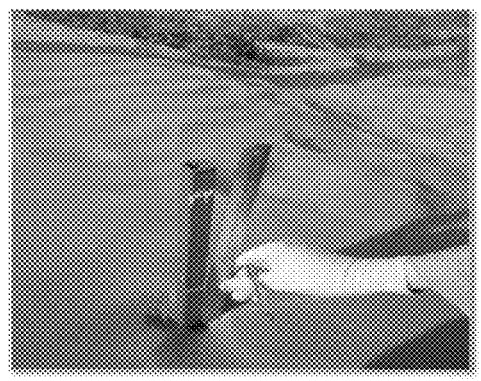
FIGURE 4A  FIGURE 4B
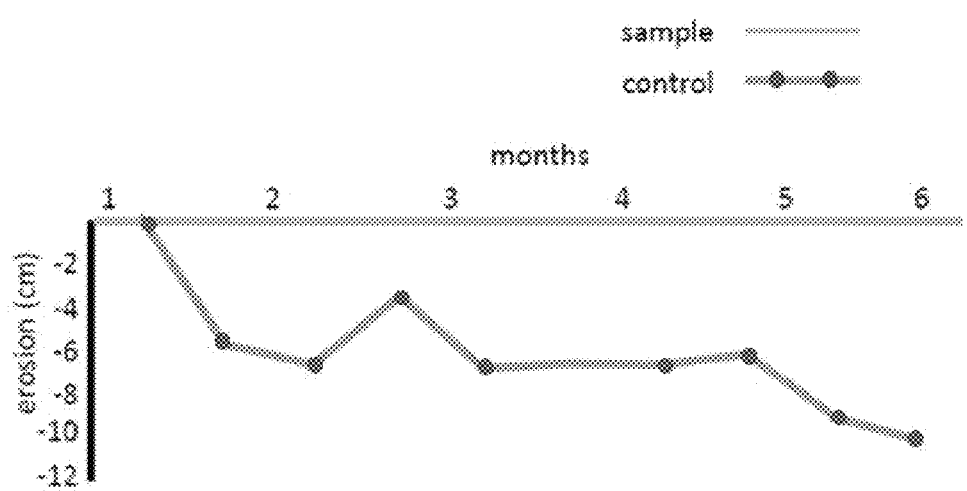
FIGURE 5

BIOPOLYMERS HAVING COILED NANOSTRUCTURES AND PROCESSES INCORPORATING THE BIOPOLYMERS

The present application claims priority to U.S. Provisional Patent Application No. 62/116,007, filed Feb. 13, 2015, the entire content of which is incorporated by reference herein.

BACKGROUND OF THE INVENTION

It is known in the art that biopolymer macromolecules may, such as through a reaction with crosslinking agents, be used to form various biopolymeric networks and biomaterials. By the present invention, however, it has now been found that the macromolecular shape of a biopolymer may be altered in order to create a biopolymer having a coiled nanostructure. These biopolymers having coiled nanostructures may then be subjected to conditions at which cross-linking occurs in order to provide novel biopolymeric networks that may be configured to be suitable for a variety of functions, such as stabilizing particulate matter against erosion, acting as binders for different materials, and the like.

SUMMARY OF THE INVENTION

One aspect of the present disclosure is directed to a biopolymer that has been treated so as to provide the biopolymer with a coiled nanostructure. In various embodiments, the biopolymer may comprise one or more starches, one or more hemicelluloses, one or more alginates, or a combination of any of the above.

Another aspect of the present disclosure is directed to a method for treating a biopolymer or biomass to create a biopolymer having a coiled nanostructure. The process comprises the physical transformation of a biopolymer macromolecule from a relatively large, substantially linear structure to a coiled structure having a significantly smaller size. In various embodiments, the process comprises a series of steps that can generally be described as (1) preparing a solution in which the physical transformation from substantially linear macromolecule to nanocoil may take place and in which the resulting nanocoil will be stable, (2) performing the physical transformation, and (3) stabilizing the resulting solution of nanocoils.

Another aspect of the present disclosure is directed to a solution of biopolymer nanocoils, such as in water. In various embodiments, the biopolymer may be present in a number of different ranges of concentrations and the solution may also contain any of a variety of additives in order to render the solution particularly suitable for an application, such as the applications described herein.

Another aspect of the present disclosure is directed to a biopolymeric network comprising the biopolymer nanocoils. Within the biopolymeric network, the biopolymer nanocoils may be cross-linked with other biopolymer nanocoils, other polymeric materials, or a combination thereof. The biopolymeric network may be configured to incorporate any of a variety of solid particles, thereby acting to hold the solid particles together against external stresses, solvents, and the like.

Another aspect of the present disclosure is directed to a process for stabilizing particulate solids, such as naturally-occurring particles (e.g. sand and soil) or industrial particles (e.g. mining dust), against erosion by incorporating the particles into a biopolymeric network. In various embodiments, the process comprises contacting the particles with a composition comprising one or more biopolymers having coiled nanostructures and causing the composition to undergo cross-linking to form a biopolymeric network incorporating the particles.

Another aspect of the present disclosure is directed to a process for forming iron ore pellets. In various embodiments the process comprises combining crushed iron ore with a binder that includes one or more biopolymers having coiled nanostructures and causing the one or more biopolymers to undergo cross-linking to form a biopolymeric network.

For a better understanding of the invention, its operating advantages, and the specific objects attained by its uses, reference should be had to the accompanying drawings and descriptive matter in which there is illustrated an exemplary embodiment of the invention.

BRIEF DESCRIPTION OF THE DRAWINGS

A clear conception of the advantages and features of one or more embodiments will become more readily apparent by reference to the exemplary, and therefore non-limiting, embodiments illustrated in the drawings:

FIG. 4A is an image showing an erosion test result of a sand dune treated in accordance with an embodiment of the present disclosure.

FIG. 4B is an image showing an erosion test result of an untreated (control) sand dune.

FIG. 5 is a graph demonstrating the effectiveness of an embodiment of the present disclosure for stabilizing sand against erosion.

DETAILED DESCRIPTION OF THE INVENTION

Biopolymer Nanocoils

Figure 1:
FIG. 1 is an electron microscope image showing the nanocoils of an embodiment of the present disclosure in solution.
Figure 2:
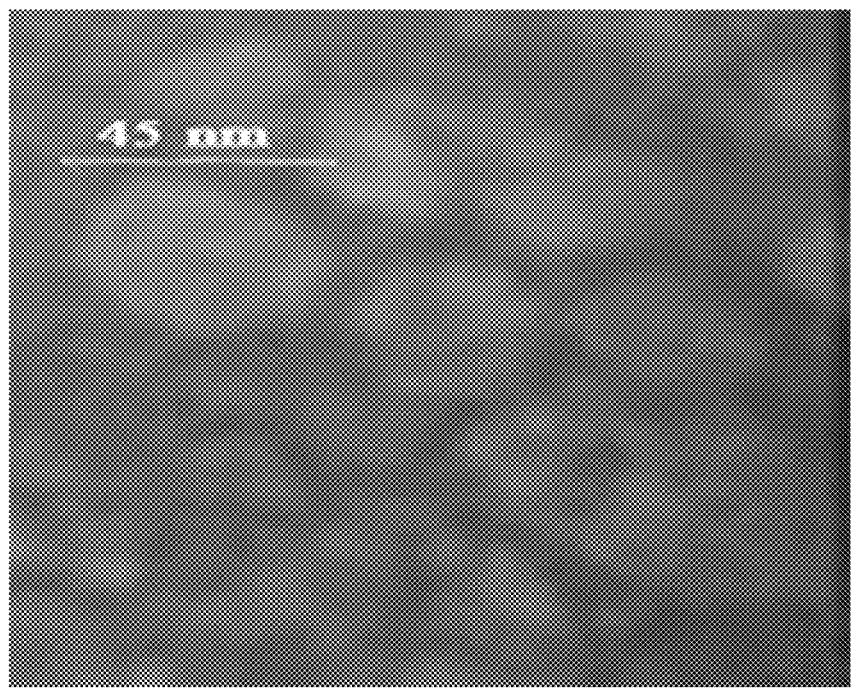
FIG. 2 is an electron microscope image showing the nanocoils of an embodiment of the present disclosure in solution.
Figure 3:
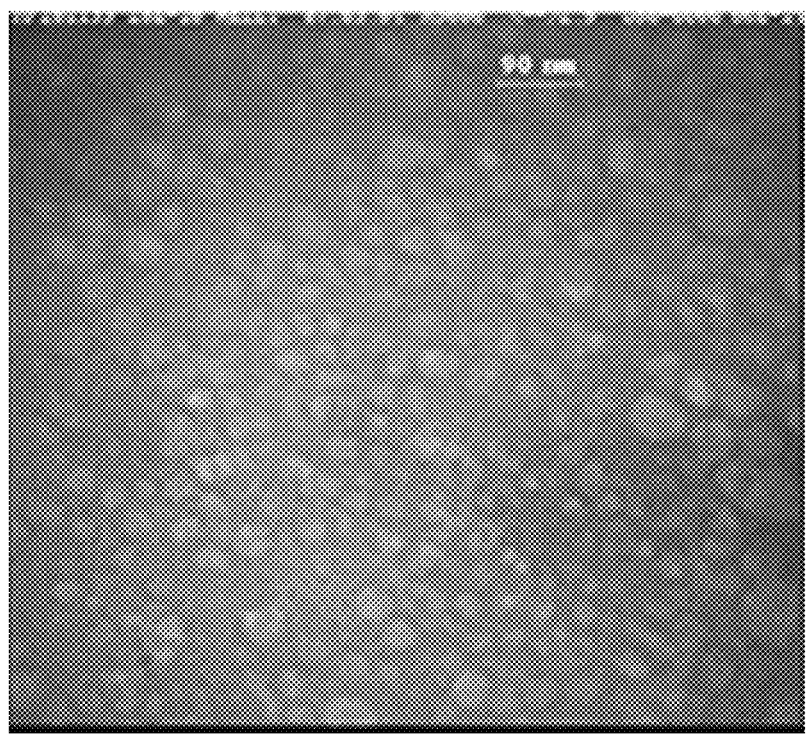
FIG. 3 is an electron microscope image showing the nanocoils of an embodiment of the present disclosure in solution.

Throughout the present disclosure, the terms "biopolymer having a coiled nanostructure" and "biopolymer nanocoils" may be used interchangeably to describe the array of structures that are the subject of the present disclosure. These structures generally refer to biopolymers that have had their macromolecular shape changed from linear to coiled, such as by the physical process of the present disclosure.

Embodiments of the present disclosure are directed to biopolymers having coiled nanostructures. Generally, these biopolymers will consist of polysaccharide chains. For example, in some embodiments, the biopolymer may comprise a molecular chain containing a large number of glucose units joined by glycosidic bonds, such as would be representative of various starches. In some embodiments, the biopolymer may comprise a molecular chain representative of any of a variety of hemicelluloses, including but not limited to xylan, glucuronoxylan, arabinoxylan, glucomannan, and xyloglucan. In some embodiments, the biopolymer may comprise a molecular chain representative of any of a variety of alginates. For purposes of this disclosure, in various embodiments the biopolymer nanocoils may be identified as a starch, hemicellulose or alignate, each of which identifies the class in which the molecular chain of the biopolymer would generally be classified.

The size distribution of the biopolymer nanocoils may be controlled during the process by which they may be prepared. Generally, the biopolymer nanocoils may have a distribution of sizes ranging between about 45 nm and about 800 nm. In some embodiments, the majority of the biopolymer nanocoils may be between about 80 and about 110 nm, for instance between about 90 and 100 nm. In other embodiments, the majority of the biopolymer nanocoils may be smaller, e.g. between 45 and 90 nm, or larger, e.g. between 100 and 800 nm.

Generally, the biopolymer nanocoils of the present disclosure are produced from biomass. For example, biomass from the pulp and paper industry has been found to be particularly suitable for the preparation of biopolymer nanocoils. Thus, in some embodiments, the biopolymer may be prepared from a biomass raw material that comprises byproducts from a pulp or paper mill. The biomass contains a substantially linear biopolymer macromolecule which may be converted to a biopolymer having a coiled nanostructure in accordance with the process described herein. In some embodiments, for example, the biomass contains at least one of a hemicellulose biopolymer macromolecule, a starch biopolymer macromolecule, and an alginate biopolymer macromolecule.

The biomass raw material may also comprise a mixture of different biopolymers. For example, in one embodiment, the biomass raw material may comprise both a hemicellulose biopolymer macromolecule and a starch biopolymer macromolecule. This mixed biomass raw material may be prepared, for example, by combining a source of hemicellulose biopolymer macromolecules, such as pulp mill biomass, with a source of starch biopolymer macromolecules, such as potato starch or corn starch. The biomass raw material may also contain any number of additional materials, which may serve different roles in the preparation of the biopolymer nanocoil.

Process for Preparing Biopolymer Nanocoils

The biopolymer nanocoils may be produced by a biophysical process by which the shape of a biopolymer macromoecular chain is altered. For example, the biopolymer nanocoils may be made by a process that involves preparing a solution containing one or more biopolymer macromolecules, creating conditions in which a biopolymer nanocoil may be stable, and treating the biopolymer macromolecule in order to cause a change in shape and thereby form a coiled nanostructure.

First, an alkaline aqueous solution containing a biopolymer macromolecule chain is prepared. The aqueous solution may be made alkaline by any known means. For example, trisodium phosphate, sodium hydroxide, or the like may be added to produce an alkaline solution. The pH of the solution may generally be controlled to be within the range between about 7 and about 11, alternatively between about 8 and 11. In some embodiments, the temperature may also be maintained within the range between about 20° and about 55° C., more preferably between about 25° and about 50° C.

Next, one or more stabilizing agents are added to the solution. The stabilizing agent creates repulsive forces that stabilize the formation of nanocoils within the aqueous solution by, for example, preventing undesirable crosslinking of the nanocoils within the solution. For example, the stabilizing agent may introduce negative ions into the solution, which act to create repulsive forces. The stabilizing agent may also act as a plasticizing agent by increasing the chain mobility of the biopolymer macromolecule. The amount of stabilizing agents necessary for the preparation of biopolymer nanocoils will depend on a number of factors, including the composition of the biomass raw material, the concentration of the biopolymer macromolecule in the solution, and the like. Generally, the one or more stabilizing agents may, for example, be added in an amount that ranges between about 1% and about 50%, alternatively between about 1% and about 30%, alternatively between about 1% and about 20% by weight of the solution.

In some embodiments, the stabilizing agent may comprise glycerol, polyethylene glycol, or combinations thereof. The stabilizing agent may also comprise phosphate, sulfate, or combinations thereof. When introduced into the alkaline solution, each of these stabilizing agents introduces negative ions into the solution. Upon formation of the biopolymer nanocoils, the negative ions provide negative charges which results in repulsive forces that act to prevent cross-linking of coiled biopolymers.

The solution may also comprise one or more additional agents. In some embodiments, one or more additional agents may be present in the biomass raw material and thus may be introduced to the solution along with the substantially linear biopolymer macromolecules. For example, one or more of lignin, furfural, and acetic acid may be present in the biomass raw material. Biomass byproducts from pulp and paper mills, for instance, generally contain each of lignin, furfural, and acetic acid. Alternatively, an additional composition comprising one or more of lignin, furfural, and acetic acid may be separately added to the solution. For example, when starch is used as the biomass raw material, an additional composition, for instance an additional amount of biomass that contains lignin, furfural, and/or acetic acid, may be separately added.

In some embodiments, furfural may be present during preparation of the biopolymer nanocoil. Furfural may be present in the biomass raw material from which the biopolymer nanocoil is prepared or it may be independently added to the solution. For instance furfural is often present in the biomass byproducts from pulp and paper mills. Furfural enhances the cross-linking density of the biopolymer network formed by the nanocoils. Furfural may also act on the biopolymer nanocoils to provide improved mechanical properties.

In some embodiments, lignin may be present during preparation of the biopolymer nanocoil. Lignin may be present in the biomass raw material from which the biopolymer nanocoil is prepared or it may be independently added to the solution. For instance, lignin is often present in the biomass byproducts from pulp and paper mills. In some embodiments, lignin forms between about 2% and about 5% by weight of the biomass raw material. Lignin may act as a plasticizer, thereby promoting flexibility and reducing brittleness of the biopolymer network that may be formed by the nanocoils. Lignin may also serve to increase the repulsive forces between the nanocoils in solution.

In some embodiments, acetic acid may be present during preparation of the biopolymer nanocoil. Acetic acid may be present in the biomass raw material from which the biopolymer nanocoil is prepared or it may be independently added to the solution. For instance, acetic acid is often present in the biomass byproducts from pulp and paper mills. In some embodiments, acetic acid may form between about 10% and about 19% by weight of the biomass raw material. Carboxylic acid groups from the acetic acid may bind to the surface of the biopolymer macromolecule, such as the starch or hemicellulose, as described below, thereby assisting with the conversion of the biopolymer macromolecule to a biopolymer nanocoil.

Once the solution has been adequately stabilized, a carboxylic acid agent is added to the solution. The carboxylic acid groups bind with the surface of the biopolymer macromolecular chain. In the stabilized solution, the addition of the carboxylic acid groups to the surface of the biopolymer macromolecular chain causes the substantially linear biopolymer macromolecule to undergo a physical transformation to a coiled structure. During the addition of the carboxylic acid groups, and the resulting physical transformation, the radius of gyration of the biopolymer macromolecule is reduced. Generally, any carboxylic acid, or a salt thereof, may be used. In some embodiments, for instance, the carboxylic acid agent may be selected from monochloroacetic acid, acetic acid, or the salts thereof.

One or more additional agents may be added during or after the physical transformation. For example, boric acid or a salt thereof, such as borax, may be added to the solution in order to lower the radius of gyration of the biopolymer and assist with the physical transformation. Boric acid, borax, or the like may also play a role in the stabilization of the biopolymer nanocoils.

The sizes of the coiled biopolymers may then be reduced through a process that includes the formation of a microemulsion of oil within the aqueous solution. In some embodiments, a small amount of oil may be added to the aqueous solution and the solution mixed. The mixing of an oil phase within the aqueous solution reduces the size of the coiled biopolymer structures, producing biopolymer nanocoils. The size distribution of the biopolymer nanocoils may be controlled through careful control over the speed of the mixer. The introduction of an oil phase into the solution also serves to stabilize the biopolymer nanocoils in the solution. Generally, the amount of oil added to the aqueous solution is small, for example between about 0.5% and about 5% by weight, alternatively between about 0.5% and about 2% by weight.

In some embodiments, additional stabilization of the biopolymer nanocoils can be provided at the end of the process. In some embodiments, a cation-containing material such as calcium carbonate may be added to the solution in order to provide an amount of positively charged cations to react with a portion of the negatively charged biopolymer nanocoils. Generally, the amount of the cation-containing material that may be added is small compared to the total amount of biopolymer nanocoils. For instance, in some embodiments, calcium carbonate may be added in an amount between about 1% and about 5% by weight, alternatively between about 2% and about 3% by weight of the solution.

Example 1

2%-10% (by weight) starch was solved in water to produce an aqueous solution. 1%-5% trisodium phosphate was added to produce an alkaline solution. 5%-10% glycerol was then added to create the right conditions for formation of the biopolymer nanocoils. 1%-5% biomass was added to the solution to give the starch nanocoils a highly negative charge and reduce the radius of gyration of the starch polymer chains. The biomass contained, among other things, previously prepared hemicellulose nanocoils, phosphate, boron, and lignin. Then carboxylic acid groups from 2%-10% monochloroacetic acid were bound to the surface of the starch polymer chains, changing the shape of the starch macromolecules from substantially linear to coiled. 1% oil was added and the solution was mixed until the coiled starch biopolymers achieved a desired size distribution. 2%-3% borax and 2%-3% calcium carbonate were then added to the solution in order to stabilize the nanocoil size and form a stable suspension.

Solutions of the Biopolymer Nanocoils

Embodiments of the present disclosure are also directed to solutions comprising the biopolymer nanocoils. For example, embodiments are directed to a composition comprising a colloidal suspension in which the dispersed phase comprises the biopolymer nanocoils of the present disclosure. In many embodiments, the biopolymer nanocoils may be dispersed in water to provide an aqueous solution.

The fact that embodiments of the biopolymer nanocoils are soluble in water renders them particularly suitable for use in a variety of applications, since water may be used as a carrier of the biopolymer nanocoils. Thus, in many embodiments, the solution may comprise water and biopolymer nanocoils. For example, in some embodiments, the biopolymer nanocoils and other additives that may be present at the end of the preparation process may be diluted with water. The desired amount of dilution may vary depending on the desired application for the solution. In many embodiments, however, the solution may comprise between about 90 and 99.5 wt. % water, alternatively between about 95 and 99.5 wt. % water, alternatively between about 98 and 99.5 wt. % water.

In some embodiments, the solution may comprise a mixture of different biopolymer nanocoils. The types and amounts of biopolymer nanocoils may be selected depending on the particular application for the solution. For example, some embodiments may comprise a mixture of one or more starch biopolymer nanocoils and one or more hemicellulose biopolymer nanocoils. Other embodiments may comprise a mixture of one or more alginate biopolymer nanocoils, one or more starch biopolymer nanocoils, and one or more hemicellulose biopolymer nanocoils.

The electrical charge of the dispersed phase within the solution may be adjusted by the inclusion of negatively charged ions. For example, in some embodiments, the solution may also comprise boron ions (e.g., from the addition of borax), phosphate ions (e.g., from the addition of calcium phosphate), carbonate ions (e.g. from the addition of calcium carbonate), and glycerol ions. Although the amount of ions present in the solution may vary, for many applications ions may be present in the solution in amounts between about 5 wt. % and about 20 wt. %. Adjustment of the electrical charge of the solution may be useful to control the time and location of crosslinking, as well as the properties of the resulting biopolymeric network.

In some embodiments, the biopolymer nanocoil may be concentrated to provide a composition that is more efficient for transportation. The desired solution containing the biopolymer nanocoil may then be prepared at the location of its application, such as by dilution using a locally available source of water.

Biopolymer Networks Comprising the Biopolymer Nanocoils

Embodiments of the present disclosure are also directed to biopolymeric networks comprising the biopolymer nanocoils. These biopolymeric networks are prepared by the cross-linking of the biopolymer nanocoil with at least one other material. In some embodiments, biopolymer nanocoils may be cross-linked with one or more other biopolymer nanocoils to form a biopolymeric network. The biopolymer nanocoils that are cross-linked to form a biopolymeric network may be of the same type or of different types. For example, in some embodiments a starch biopolymer nanocoil may be cross-linked with at least one other starch biopolymer nanocoil, hemicellulose biopolymer nanocoil, alginate biopolymer nanocoil, or the like. In some embodiments, the biopolymeric network may comprise each of a starch biopolymer nanocoil, a hemicellulose biopolymer nanocoil, and an alginate biopolymer nanocoil. In some embodiments, no separate cross-linking agents are necessary in order to prepare the biopolymeric networks of the present disclosure.

As will be described in more detail below, the biopolymeric network may be formed within a composition comprising any of a variety of solid particles, such that the biopolymer network incorporates the solid particles, e.g. by coating and binding loose particles. By forming a complex web of interlocking particles and biopolymer, the biopolymeric network acts to hold the composition comprising the solid particles together against external stresses, solvents, and the like.

Use of Biopolymer Nanocoils and Biopolymeric Networks Produced Therefrom

The biopolymer nanocoils, solutions comprising the biopolymer nanocoils, and biopolymeric networks formed by the biopolymer nanocoils are useful for a variety of applications across a range of fields. The unique properties of the biopolymer nanocoils render them particularly suitable for a variety of applications. Although the biopolymer nanocoils may be prepared from industrial waste that may be environmentally unfriendly or toxic, the biopolymer nanocoils are nontoxic and safe for the environment. Additionally, because the biopolymer nanocoils may be dispersed in water, they are easy and safe to handle and to apply. The solutions of biopolymer nanocoils may be odorless, ozone friendly, and nonflammable. The solutions may also easily be configured such that few, if any, impurities are present.

Properties of the biopolymer nanocoils may also be customized for a particular application. For example, the size of a biopolymeric network may be controlled. Controlling the size of a biopolymeric network may allow one to provide nanocoils that penetrate deeply into a collection of particulate matter.

Stabilizing Particulate Solids

One of the primary applications for the biopolymer nanocoils is through stabilization of solid particles, such as loose particulate matter. For example, the stabilization of soil and sand against erosion is an important environmental objective in many locations. Desertification, for example, is thought to cost tens of billions of dollars annually by, ruining arable land, damaging machinery, destroying roads and railroads, and the like. One cause of desertification and other environmental damage is environmental dust, i.e. earthen material such as sand and soil that becomes airborne. Environmental dust is often carried by the wind to undesirable locations. Loose soil and sand dunes are primary sources of environmental dust.

Road dust, which is primarily caused by vehicles moving on paved roads or unpaved roads, is another primary source of environmental dust. Road dust may be particularly harmful because it is often contaminated with pollutants such as cement residues, pollutants from vehicle exhaust, engine oil, snow and ice control materials (e.g. salts), animal droppings, and the like. Environmental dust, and particularly road dust, is an irritant in many communities and prolonged exposure to road dust may be responsible for cases of respiratory illnesses and lung cancer.

Industrial dust, i.e. industrial materials—typically byproducts or waste—in the form of loose particles, is both a common source of air and water pollution and often a source of lost revenue, since the industrial materials are often useful as raw materials in other processes. Two of the largest sources of industrial dust are the construction and mining industries. The industrial dust from mines and quarries is often present in large piles, which may easily be carried away by the wind, eroded and carried into the soil by rainwater, and the like.

The conventional treatment for controlling environmental and industrial dust is simply to spray water on the offending areas, e.g. sand dunes, roads, piles of industrial dust, etc. This treatment is largely ineffective and impractical. The water only impacts the surface of a pile of dust and dries out quickly, especially in the hotter and drier climates often present at mining and quarrying sites. Because its effect is so short-lasting, control of dust by spraying it with water requires frequent, e.g. multiple times per day, treatment and thus high labor costs. Treatment in this manner also requires huge expenditures of water, often where water is scarce and/or needed for other uses. While some have attempted to increase the effectiveness of the water by adding chemicals, these chemicals typically increase the overall costs of the treatment and often add undesirable contaminants to the dust.

In embodiments of the present disclosure, solid particles such as environmental dust, road dust, industrial dust, or combinations thereof may be stabilized against wind and water erosion through the incorporation of the particles into a biopolymeric network. The process for stabilizing solid particles against erosion involves contacting the solid particles with a composition that includes a biopolymer having a coiled nanostructure and then causing the biopolymer to undergo cross-linking to form a biopolymeric network that incorporates the solid particles.

The step of contacting the solid particles may typically involve spraying a composition, such as an aqueous solution of the biopolymer nanocoils, onto the solid particles. For instance, in various embodiments, an aqueous solution of biopolymer nanocoils may be sprayed onto a sand dune, a road, or a pile of industrial dust. In other embodiments, however, the step of contacting the solid particles may involve mixing a composition containing the biopolymer nanocoil with the particulate solids.

The concentration of biopolymer nanocoil in the composition may be adjusted depending on the application. In many embodiments, the biopolymer nanocoil may be present as a small component of the solution. For example, in some embodiments, the biopolymer nanocoil may comprise between about 0.5 wt. % and about 10 wt. %, alternatively between about 0.5 wt. % and about 5 wt. %, alternatively between about 0.5% wt. % and about 2 wt. %. The solution may also comprise between about 90 wt. % and about 99.5 wt. % water, alternatively between about 95 wt. % and about 99.5 wt. % water, alternatively between about 98 wt. % and about 99.5 wt. % water.

The step of causing the composition to undergo cross-linking may involve the addition of cross-linking agents. In some embodiments, however, the composition may be configured so that the solid particles, themselves, act as a cross-linking agent. For example, positive ions present in the solid particles may bring about an ionic reaction with the negatively-charged biopolymer nanocoils, as well as the other negatively-charged ions that are present in the solution. These ionic reactions may produce conditions at which the biopolymer nanocoils undergo crosslinking.

The presently disclosed process provides a number of benefits over those known in the art. For example, because of the small sizes of the biopolymer nanocoils, the solution of biopolymer nanocoils penetrates a pile of dust, thereby acting on more than simply the surface layer of dust, providing the treatment with an increased effectiveness. For example, in one embodiment, the solution was found to diffuse into a sand dune at a rate of about $2.5 \times 10^{-4}$ cm/s.

Additionally, because the biopolymeric network may be created using biopolymer nanocoils that are present in an aqueous solution, the treatment method does not give rise to the contamination problems that are associated with typical chemical treatments. In fact, a mixture of soil and sand sprayed with an aqueous solution of a biopolymer nanocoil was found to encourage the germination of seeds. Also, due to the long-acting effects of the biopolymeric network, the frequency with which the aqueous solution of biopolymer nanocoils would need to be applied may be greatly decreased relative to conventional methods, i.e. water. For example, a pile of mining dust that would need to be treated at least once per day using conventional methods, i.e. water, could be treated only once per week using embodiments of the present disclosure.

The use of biopolymer nanocoils in providing dust control was tested using a wind tunnel testing method.

Three wind tunnels were constructed using 4 inch PVC pipes and blowers capable of generating various simulated wind speeds (5-50 km/hr). Six 80 g samples of iron ore particles (sized from 212 microns to 512 microns) were formed into simulated heaps using a cone. Three heaps were then sprayed with approximately 7 mL of a solution comprising a biopolymer nanocoil. The remaining three heaps were used as control samples. Each of the heaps was then placed into a wind tunnel for 15 minutes and subjected to one of a variety of wind velocities. One week after the treated samples were tested, they were placed back in the wind tunnels to test their effectiveness after a week of drying. Test results are shown in Table 1 below:

TABLE 1

| Sample | Pre-Test Mass (g) | Nanocoil Spray (g) | Wind Velocity (km/hr) | Post 15 min Test Mass (g) | Post 1 week Test Mass (g) |
|---|---|---|---|---|---|
| Control 1 | 80 | — | 5 | 80 | — |
| Control 2 | 80 | — | 30 | 0 | — |
| Control 3 | 80 | — | 50 | 0 | — |
| Treated 1 | 80 | 6 | 5 | 80 | 80 |
| Treated 2 | 80 | 7 | 30 | 80 | 80 |
| Treated 3 | 80 | 7 | 50 | 80 | 80 |

After the treated samples were sprayed with the nanocoil solution, they had a wet appearance and the fine particles in the sample were stabilized. After the samples were subjected to the wind tunnels for 15 minutes, the treated samples appeared dry and formed a hard crust on the surface. The tests showed that the nanocoil product was effective as a dust control agent as no sample mass was lost with wind speeds ranging from 5-50 km/hr after 15 minutes of exposure. The control samples (untreated) showed that the entire sample was lost at wind speeds higher than 30 km/hr (the exact wind speed when the entire sample is lost was not determined in this testing, although based on the findings it would be between 5 km/hr and 30 km/hr). After one week the treated samples were placed into the wind tunnels again without any further nanocoil treatment and once again no sample mass was lost, showing that even when dried for one week the nanocoil spray is an effective dust control agent.

In order to test the efficacy of the biopolymer nanocoils in stabilizing solid particles in the field, a solution containing about 1 wt. % biopolymer nanocoil and about 99 wt. % water was prepared. The solution was sprayed onto a portion of a sand dune. As a control, a similar untreated portion of the sand dune was monitored. For each of the portions, a post was inserted into the sand dune to a specific depth and the starting level of the sand against the post was marked. The level of sand relative to each of the markers was monitored over the course of multiple months. As shown in FIG. 4A, the sand level of the sample that was treated with the aqueous solution of biopolymer nanocoil remained constant after six months. In contrast, the sand level of the control portion of the sand dune underwent a significant degree of erosion after six months, as shown in FIG. 4B. The results of the test are shown graphically in FIG. 5. From these results, it was confirmed that the biopolymer nanocoil of the present disclosure was effective at stabilizing particulate solids against erosion, such as may be caused by wind and precipitation.

Application as a Binder

In addition to serving to stabilize particulate matter against erosion and the like, the biopolymer nanocoils may also be used as a binder, i.e. to hold one or more materials together. For example, the biopolymer nanocoils and biopolymeric networks produced therefrom may be used in protecting various substances against the deleterious effects of moisture or water. In some embodiments, the biopolymer nanocoils may be applied to wood pellets. After undergoing cross-linking, the biopolymeric network produced by the biopolymer nanocoil will protect the wood pellets against stresses caused by water. Similarly, in some embodiments, the biopolymer nanocoils may be applied to various baits used in the fishing and crabbing industries. After undergoing cross-linking, the biopolymeric network produced by the biopolymer nanocoil will protect the bait against water solvency, thereby extending the lifespan of the bait when it is submerged in a body of water.

It has also presently been found that the biopolymer nanocoils may be particularly suitable as a binder material in the steel industry. The steel industry relies on iron ore as a primary raw material. Raw iron ore goes through a number of processing steps on the path to being used to make steel. Notably, crushed iron ore is processed into concentrated pellets, which are used in the steel-making process. These pellets are conventionally prepared by mixing crushed iron ore and a binder called bentonite. The use of bentonite, however, introduces silica and alumina impurities, which take the place of iron ore in the pellet, bringing down the concentration of iron in the pellet. The removal of the silica and alumina impurities requires heating to high temperatures, e.g. about 1300° C., greatly increasing both the costs of the pelletization process and the amount of time that is required to make the pellets. While the use of certain organic and inorganic binders has been suggested, these binders suffer from a number of drawbacks including, increased costs and/or changes to process equipment, an inability to withstand high temperatures, the production of less durable pellets, etc.

Accordingly, embodiments of the present disclosure are directed to a process for preparing iron ore pellets by using one or more biopolymer nanocoils and forming a biopolymeric network that acts as a binder within the pellet. The process involves combining crushed iron ore with a binder comprising one or more biopolymers having coiled nanostructures and causing the one or more biopolymers to undergo cross-linking to form a biopolymeric network. In order to provide a pellet that at least in some ways resembles conventional iron ore pellets, the biopolymer nanocoils may be combined with a reduced amount of bentonite. And significantly, the process can be configured to mirror so that it can be performed in existing conventional process lines, thereby ensuring that no process equipment changes are necessary.

For example, the process may comprise forming a mixture by combining crushed iron ore, bentonite, and a first aqueous solution, the first aqueous solution containing at least one biopolymer having a coiled nanostructure. The biopolymer nanocoils of the first aqueous solution may include one or more different types of biopolymer chains. For example, in some embodiments, the first aqueous solution may comprise a starch biopolymer nanocoil, a hemicellulose biopolymer nanocoil, or a combination thereof. The concentration of biopolymer nanocoils in the first aqueous solution may vary. In some embodiments, for example, the biopolymer nanocoils may make up between about 1 wt. % and about 5 wt. % of the first aqueous solution. The first aqueous solution may also comprise one or more additional binders, such as iron, calcium, lignin, boron, aluminum, etc.

The mixture may then be shaped into a pellet and sprayed with a second aqueous solution, the second aqueous solution containing at least one biopolymer having a coiled nanostructure. The biopolymer nanocoils of the second aqueous solution may include one or more different types of biopolymer chains. For example, in some embodiments, the second aqueous solution may comprise an alginate biopolymer nanocoil. The concentration of biopolymer nanocoils in the second aqueous solution may vary. In some embodiments, for example, the biopolymer nanocoils may make up between about 1 wt. % and about 5 wt. % of the second aqueous solution. The second aqueous solution may also comprise one or more additional binders, such as iron, calcium, lignin, boron, aluminum, etc.

In some embodiments, the process may be configured so that at least one biopolymer having a coiled nanostructure in the second aqueous solution is configured to react with at least one biopolymer having a coiled nanostructure in the first aqueous solution to form a biopolymeric network. Therefore, when the biopolymer nanocoils present in the mixture come into contact with the biopolymer nanocoils that are sprayed onto the mixture during (and/or after) formation of the pellets, the biopolymer nanocoils undergo a cross-linking reaction. The resulting biopolymeric network acts as a binder to the iron ore and other materials, e.g. bentonite, in the pellet.

Alternatively, in some embodiments, the first aqueous solution may comprise a binder having a cross-linking agent that is effective to promote cross-linking of the biopolymer nanocoils that are present in the second aqueous solution. Similarly, the second aqueous solution may comprise a binder having a cross-linking agent that is effective to promote cross-linking of the biopolymer nanocoils that are present in the first aqueous solution. Therefore, when the two solutions come into contact with one another, the biopolymer nanocoils present in each solution undergo a cross-linking reaction. The resulting biopolymeric network acts as a binder to the iron ore and other materials, e.g. bentonite, in the pellet.

Due to the formation of the biopolymeric network, the green pellets that result from the mixing and shaping steps may be strong enough that a firing step is not needed. However, in some embodiments, the shaped green pellets may be fired to increase the hardness of the pellet. As compared to the conventional process, however, the firing step may occur at a temperature that is less than 1300° C., alternatively less than 1250° C., alternatively less than 1200° C., alternatively less than 1100° C., and alternatively less than 1000° C.

Figure 6:
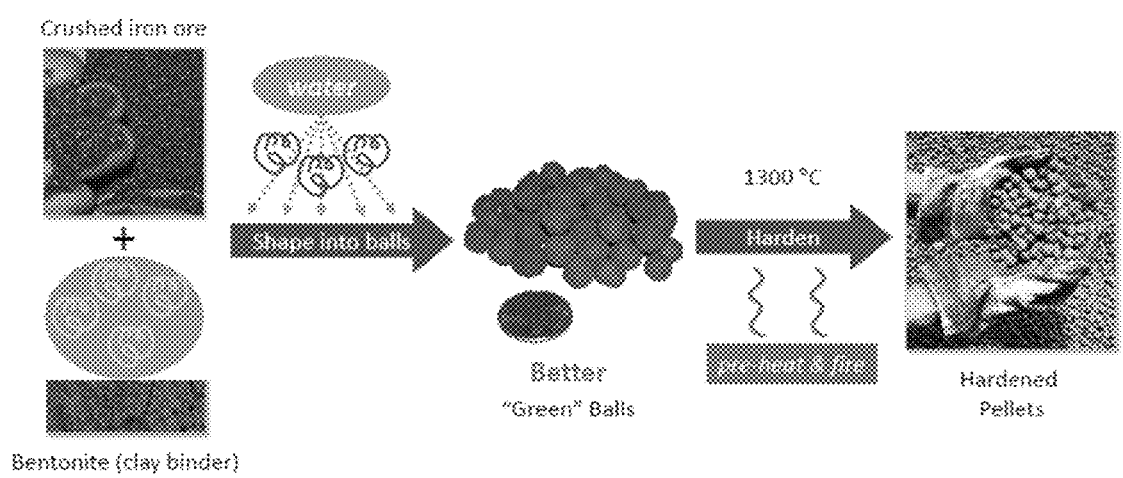
FIG. 6 is an illustration of a process for forming iron ore pellets in accordance with embodiments of the present disclosure.

Because this process is designed to be performed on existing process equipment, the various steps of the process described above mirror the steps performed in the conventional process. An example of such a process is illustrated in FIG. 6. For example, in the conventional process, crushed iron ore is mixed with bentonite and then that mixture is shaped into pellets while being sprayed with water. The resulting green balls are then fired at about 1300° C. in order to produce the hardened iron ore pellets. It is hereby contemplated that the steps of the process described above may also be modified, such as where the use of existing process equipment was not desirable, as would be discernable to a person of ordinary skill in the art based on a reading of the present disclosure.

Embodiments of the present disclosure are also directed to green balls comprising iron ore, bentonite, and a biopolymeric network of cross-linked biopolymers, in which one or more of the biopolymers have a coiled nanostructure.

Green ball pellets produced by a conventional process typically contain between about 0.9 wt. % and about 1.2 wt. % bentonite. In contrast, green ball pellets produced by the presently disclosed process may comprise a bentonite content, and with it a content of silica and alumina impurities, that is reduced by about two-thirds or more. For example, green ball pellets produced as disclosed herein may contain between about 0 wt. % and about 0.5 wt. %, alternatively between about 0.1 wt % and about 0.3 wt. % bentonite.

Significantly, the biopolymeric networks of the present disclosure are configured to withstand temperatures of at least about 750° C., alternatively at least about 800° C., alternatively at least about 850° C. Accordingly, use of the biopolymer nanocoils of the present disclosure does not suffer from the problem that has plagued previous attempts with biopolymer binders in iron ore pelleting—the burning off of the biopolymer at temperatures of about 500° C. By the time that the biopolymer network of the present disclosure begins to burn, the iron ore in the pellet has reached a temperature at which it has sufficiently bonded together. Therefore, by creating a biopolymeric network that is configured to withstand temperatures of at about 800° C., for example, pellets produced in accordance with the present disclosure may be used directly in place of conventional bentonite-containing pellets without any changes to existing firing and steel-making processes or equipment.

It is also generally required that iron ore pellets are durable, such as is typically characterized by drop number testing, compression strength testing, and thermal stability testing. The iron ore pellets of the present disclosure are at least as durable as conventional bentonite-containing pellets. In fact, the iron ore pellets of the present disclosure may be configured to perform better than conventional bentonite-containing pellets in many durability tests.

A study comparing conventional pellets with those containing a biopolymeric network formed in accordance with the present disclosure was conducted. Green balls having six different compositions were prepared as set forth in Table 2.

TABLE 2

| Test # | Sample Mass (g) | Bentonite (g) | Nanocoil A (ml) | Nanocoil A (ml) | Nanocoil B (ml) | Water (ml) |
|---|---|---|---|---|---|---|
| 1 | 25 | — | 10 | — | 15 | — |
| 2 | 25 | 2.00 | — | — | — | 27 |
| 3 | 25 | — | — | 10 | 19 | — |
| 4 | 25 | 1.50 | — | 10 | 18 | — |
| 5 | 25 | 0.75 | — | 10 | 17 | — |
| 6 | 25 | — | — | — | — | 23 |

The iron ore material utilized was filter cake material containing coke and flux but not any binder. Nanocoil A comprises nanocoils made from starch and hemicellulose, which were concentrated with phosphate, boron and calcium ions and contained in suspension with glycerol and water soluble oils. Nanocoil B comprises nanocoils made from alginate, which were concentrated with phosphate and boron ions and contained in suspension with starch nanocoils, glycerol and water soluble oil. Once prepared, the green balls for each test was screened into the 12 mm+9.5 mm size class and split into representative sub-samples for drop number testing, moisture content and furnace test work.

A number of the green balls from each sample in Table 2 were fired by heating in a furnace at 540° C. for five minutes, then heating to 1290° C. over a period of twenty minutes and maintaining at 1290° C. for five additional minutes. The fired balls were then allowed to cool in the furnace utilizing 1000 ml/min of compressed air to accelerate cool down. An air flow of 500 ml/min was utilized during the test to assist with driving off moisture and any off-gases. The final, i.e. fired, pellets were subsequently split into representative sub-samples for drop number testing and compression strength testing.

Moisture content and drop number testing was then performed. Drop number testing involved dropping each Test Sample from a height of 50 cm under standard conditions. The moisture content and drop number testing results are summarized in Table 3.

TABLE 3

| Test # | Moisture Content (%) | No of Drops |
|---|---|---|
| 1 | 8.8 | 5 |
| 2 | 8.9 | 3 |
| 3 | 8.8 | 14 |
| 4 | 9.4 | 7 |
| 5 | 9.1 | 10 |
| 6 | 8.4 | 3 |

The results in Table 3 indicate that only Test Sample 3 and Test Sample 5 pellets were able to meet the required green ball drop number specification of 10-14 drops utilizing the bench scale disc pelletizer used in the testing. The most drops (14) were obtained when utilizing only Nanocoil B and Nanocoil A with no bentonite (Test Sample 3). When adding 3 kg/ton bentonite, the green balls were only able to complete 10 drops prior to breaking (Test Sample 5). The lowest drops (3 drops) were obtained with Test Sample 2, which utilized 8 kg/ton bentonite, and Test Sample 6, which utilized water only. Moisture content and drop number testing on prepared green balls indicated that very good green strengths could be obtained utilizing Nanocoil B combined with Nanocoil A. With the addition of 3 kg/ton bentonite, the filter cake green strength fell within the required specification of 10-14 drops.

Once the green balls were fired, all test samples were able to achieve 14 drops. Note that drop number testing was only conducted up to 14 drops. In the case of Test Sample 6 (only filter cake and water) it was observed that some of the pellets disintegrated during firing.

Dry Compression Strength Testing was also performed. The fired pellets were subjected to cold compression strength testing utilizing an INSTRON 3384 compression strength testing device. The results are presented below in Table 4.

TABLE 4

| Sample | Maximum Load (lbf) | Maximum Load (N) | Maximum Extension (in) |
|---|---|---|---|
| Test # 1 | 347 | 1541 | 0.019 |
| Test # 2 | 327 | 1453 | 0.027 |
| Test # 3 | 257 | 1145 | 0.033 |
| Test # 4 | 371 | 1652 | 0.040 |
| Test # 5 | 242 | 1077 | 0.049 |
| Test # 6 | 329 | 1464 | 0.034 |

Note that the compressive strengths as given in Table 4 were measured assuming an area of 0.11 in$^2$. Compared to each other they were all relatively close to the average strength of 312 lbf. These results show that Test 3 and Test 5 provided the lowest maximum loads (257 lbf and 242 lbf) while Test 4 provided the highest (371 lbf). Results from compression strength testing indicated that by utilizing Nanocoil B combined with Nanocoil A, with or without the addition of 3 kg/ton bentonite, resulted in good compressive strengths.

The presently disclosed process and the pellets produced therefrom provide a number of advantages. For instance, by reducing the amount of bentonite that is present in iron pellets, the concentration of iron in the pellets is increased (due to the reduction in silica and alumina impurities). Because the price of iron ore pellets is related to the concentration of iron in the pellets, the presently disclosed process provides for a higher-value pellet product. The biopolymer nanocoils that are added in place of conventional bentonite may also contain no impurities that degrade the quality of the iron, such as silica, alumina, sulfur, or phosphorous, and no impurities, such as sodium, potassium, and chlorine, that cause operating problems in blast furnaces. Additionally, the use of biopolymer nanocoils in the iron pellet production process decreases the costs of the process. For example, by reducing the amount of bentonite that is used in the manufacture of pellets, the biopolymer nanocoils reduce the costs associated with bentonite shipments and storage.

The presently disclosed process also reduces costs associated with the amount of energy required to prepare the pellets. This is caused by a number of beneficial effects brought about by incorporation of the biopolymeric network. First, carbon that is introduced into the pellet by addition of the biopolymeric network may act as an additional fuel during the firing process. Second, the firing temperature used for hardening of the pellets may be greatly reduced. This is because the incorporation of the biopolymeric network both (1) increases the natural hardness of the raw, i.e. unhardened, pellets and (2) decreases the amount of silica and alumina impurities, which otherwise must be removed through extreme temperatures.

Other Applications:

The biopolymer nanocoils of the present disclosure are specifically designed to be dispersed in water and mixed with any of variety of materials. The resulting biopolymer is able to bind loose materials, forming a complex web of interlocking particles and polymer, which when dried form a hard, durable material. The ability to change the application rates of, for instance, an aqueous solution of biopolymer nanocoils provides a user with precise control and allows stabilization levels, strength and durability to be tailored as required.

In addition to the above applications, the biopolymer nanocoils may find use in, for example, road stabilization. Application of a solution of biopolymer nanocoils may prevent soil from becoming solubilized under wet conditions, thereby preventing road destruction. The biopolymer nanocoils may also find use in, for example, protection of historical buildings. A solution of biopolymer nanocoils may be sprayed over the historical building, penetrating the surfaces deeply and forming a network into it that protects it against erosion. The biopolymer nanocoils may also find use in, for example, removing calcium carbonate, sulfate, and heavy metals from water, such as waste water. By mixing a solution of biopolymer nanocoils into waste water, the biopolymer nanocoils form a network with the heavy metals, upon which the network gel containing inactive calcium, sulfate, and heavy metals may be removed.

The biopolymer nanocoils may also find use as a binder in the preparation of a variety of materials. For example, the biopolymer nanocoils may also find use as a binder in coal pellets, char pellets, or wood pellets. The biopolymer nanocoils may also find use as a binder in, for example, the preparation of bait, such as fishing bait.

The biopolymer nanocoils may also find use in, for example, hot or cold packs. Packs made using biopolymer nanocoils provide a unique network gel, as opposed to a granular or particle gel. As a result, the pack may keep cold or hot longer than other cold/hot packs in the market. Additionally, in contrast to other hot/cold packs in the market, if the cover of the cold/hot pack is cut, the biopolymer network gel will not leak.

It can be seen that the described embodiments provide a unique and novel composition and process that has a number of advantages over those in the art. While there is shown and described herein certain specific structures embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A process for preparing iron ore pellets comprising:
combining crushed iron ore with bentonite and a first aqueous solution, the first aqueous solution having a first binder comprising one or more first biopolymers having coiled nanostructures to form a mixture;
shaping the mixture into a pellet; and
spraying the pellet with a second aqueous solution, the second aqueous solution containing at least one second biopolymer having a coiled nanostructure that is configured to react with an agent in the first aqueous solution to cause the one or more first biopolymers to undergo cross-linking to form a biopolymeric network in order to prepare a green ball.

2. The process of claim 1, further comprising firing the green ball to increase its hardness.

3. The process of claim 1, in which the at least one first biopolymer in the first aqueous solution comprises one or more starches, one or more hemicelluloses, or a combination thereof.

4. The process of claim 1, in which the at least one second biopolymer in the second aqueous solution comprises one or more alginates.

5. The process of claim 1, in which the second aqueous solution comprises a second binder.

6. The process of claim 5, in which at least one of the first binder and the second binder is selected from the group consisting of boron, calcium, iron, and combinations thereof.

7. The green ball prepared by the process of claim 1, wherein the green ball comprises between about 20 g by weight and about 30 g by weight of biopolymers per 250 g.

8. The green ball of claim 7, in which the green ball comprises less than 2 g bentonite per 250 g.

9. The green ball of claim 7, wherein the biopolymeric network is configured to withstand temperatures of at least about 750° C.

10. The green ball of claim 9, wherein the biopolymeric network is configured to withstand temperatures of at least about 800° C.

11. The green ball of claim 7, wherein the green ball is configured to withstand at least 350 pounds of force of compression.

12. The green ball of claim 7, wherein the green ball is configured to withstand at least 10 drops.

* * * * *